March 5, 1968  J. B. THOMAS  3,371,681
TORCH HANDLE STRUCTURE
Filed Sept. 7, 1965
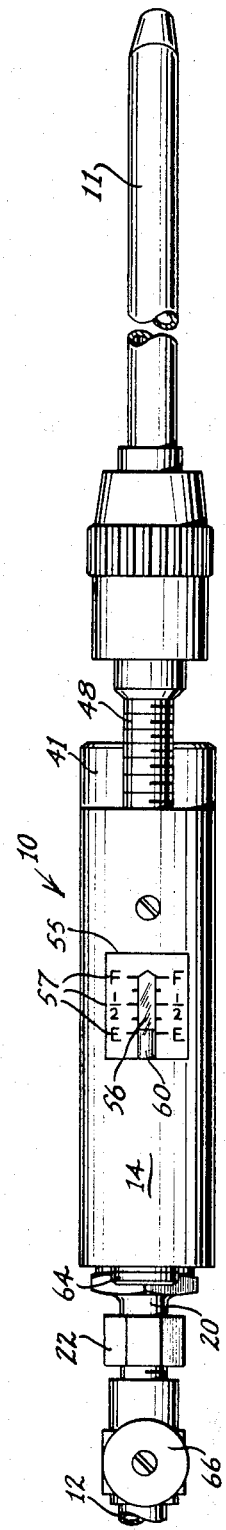
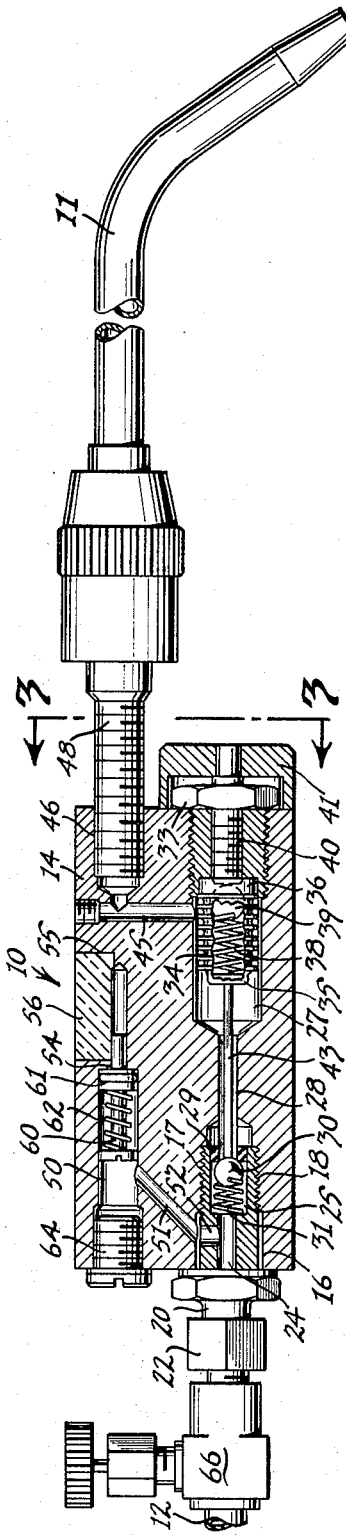
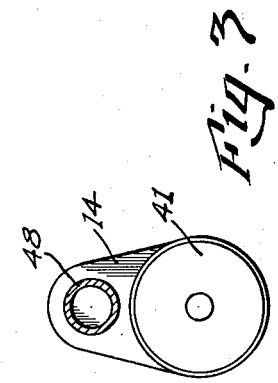
INVENTOR:
Jim B. Thomas
BY
Harrington A. Lackey
ATTORNEY United States Patent Office 3,371,681
Patented Mar. 5, 1968

3,371,681
TORCH HANDLE STRUCTURE
Jim B. Thomas, 1902 Church St.,
Nashville, Tenn. 37203
Filed Sept. 7, 1965, Ser. No. 485,224
1 Claim. (Cl. 137—557)

ABSTRACT OF THE DISCLOSURE

A torch handle structure including a pressure gauge and a pressure regulating mechanism, a fluid inlet bore in the bottom rear portion of the handle structure receiving a hose connector and an outlet bore in the front upper portion of the handle structure receiving a torch tip adapter parallel to the longitudinal axis of the handle structure.

---

This invention relates to a torch handle structure and more particularly, to a handle structure for a welding torch for containing both a pressure regulator and a pressure gauge.

The conventional welding torch includes an elongated handle having a fluid or gas conduit extending axially therethrough. A welding tip is connected to the front of the handle, and the rear of the handle is connected by a hose to a gas cylinder. The welding torch may also include a manually operated valve for regulating the amount of fluid or gas flowing through the torch.

However, the automatic pressure regulator and the pressure gauge are usually attached to the outlet of the gas cylinder. Therefore, when the operator of the welding torch is working in a position remote from the gas cylinder, the pressure gauge may not be visible at this distance. Moreover, the operator can adjust the pressure regulator only by returning to the location of the gas cylinder, which sometimes may be inconvenient.

This invention is an improvement over the handle structure disclosed in the prior Patent No. 3,139,902 of Jim B. Thomas, issued July 7, 1964. However, the handle structure of this patent, although it contains a pressure regulator and gauge, is adapted primarily for attachment to the outlet of the gas cylinder, and not for incorporation in the handle of a welding torch.

It is therefore an object of this invention to provide a new handle for a welding torch which is particularly constructed to contain a pressure regulator and a pressure gauge.

Another object of this invention is to provide a novel torch handle construction which will provide a pressure regulator and gauge available at the welding site.

Another object of this invention is to provide a combination torch handle, pressure gauge and pressure regulator in a unitary structure, which will reduce the number of elements and parts now required in conventional welding kits.

A further object of this invention is to provide a pressure regulator and gauge which will not only be convenient to the operator at the welding site, but which will be protected from damage, and occupy a minimum of space.

Further objects and advantages of the invention will be apparent from the following description taken in conjunction with the drawings, wherein:

FIG. 1 is a top plan view of the invention;
FIG. 2 is a side elevation of the invention with the handle body shown in longitudinal section;
FIG. 3 is a section taken along the line 3—3 of FIG. 2.

Referring now to the drawings in more detail, FIGS. 1 and 2 disclose a welding torch incorporating the torch handle or handle structure 10 made in accordance with this invention. To the front end of the handle 10 is attached a torch tip 11, and to the rear end of the handle is attached a hose 12 leading to a gas cylinder, not shown.

The handle 10 comprises an elongated body member or housing 14, made of brass or any other suitable material, and having a substantially egg-shaped or ovoid cross-section, as disclosed in FIG. 3, with the upper portion of the body member being smaller than the lower portion. The length of the body member 14 and the cross-sectional dimensions of the body member 14 are sufficient for the body member 14 to be comfortably gripped by an adult human hand, in order to manipulate and operate the welding torch.

Formed in the rear end of the lower portion of the body 14 is an inlet, such as the cylindrical bore 16, which has a reduced tapped front end portion 17 to receive the threaded front end portion 18 of a hose adapter 20. The rear end, not shown, of the hose adapter 20 may also be threaded to be received in the coupling nut 22. The interior of the adapter portion 18 may include an axial inlet or bore 24 communicating with a valve chamber 25. The valve chamber 25 in turn communicates with an enlarged output chamber 27, formed in the front and lower portion of the body 14, through a smaller elongated bore or passage 28. A valve seat 29 is located in the front end of the valve chamber 25 surrounding the rear end of the fluid pasage 28. A ball valve 30 is located in the valve chamber 25 and urged by spring 31 normally against the valve seat 29 to close the valve passage 28. It will be understood of course, that any type of valve may be employed in the valve chamber 25 in place of the ball valve 30, such as a conventional tire valve.

The front portion of the output chamber 27 is threaded to receive an adapter nut 33. A bellows 34 having a hard rear end or cap 35 and an open front end 36, has its front end 36 seated within the adapter nut 33, so that it is supported axially within the output chamber 27. A spring 38 is supported concentrically within the bellows 35 to bear against the inside of the cap 35 at one end and against an abutment sphere 39 at its other end. The sphere 39 is seated within the open end 36 and is adapted to be engaged for adjustment by screw 40, which is provided with an external cap 41 for manipulation thereof. The screw 40 threadedly engages the inside of nut 33.

Reciprocably and loosely mounted within the valve passage 28 is a valve actuating rod 43 which is preferably of non-circular cross-section, such as a square cross-section, in order to permit the free passage of fluid between the rod 43 and the valve passage 28. The rear end of the rod 43 is adapted to abut against the ball valve 30, while the front end of the rod is adapted to abut against the bellows cap 35. The strength of the valve spring 31 and the bellows spring 38 is such that when the fluid pressure in output chamber 27 is below a predetermined value, the bellows spring 38 will urge the bellows 34 toward the rear, causing the actuator rod 43 to move the ball valve 30 to the rear compressing the spring 31 and opening the valve passage 28, until the predetermined value of the fluid pressure in the output chamber 27 is restored. When the pressure is restored, the bellows 35 will be urged toward the front of the output chamber 27 compressing the spring 38 and permitting the ball valve 30 to close the valve passage 28. By regulating the screw cap 41, and consequently the bellows spring 38, the value of the predetermined pressure in the chamber 27 may be varied.

A fluid conduit or bore 45 extends upwardly through the housing 14 from the output chamber 27 to the upper portion of the housing 14, where the bore 45 communicates with the outlet 46 shown in the form of a tapped hole. Secured in the threaded hole 46 is a threaded tip adapter 48 mounted parallel to the longitudinal axis of the handle body 14. Thus, when the valve passage 28 is open, fluid, such as acetylene gas, may pass from the gas cylinder, not shown, through the hose 12, adapter 20, passage 28, output chamber 27, bore 45, outlet 46, adapter 48 and the torch tip 11.

The pressure gauge is mounted in the upper portion of the body 14 and comprises a cylindrical pressure chamber 50 shown parallel to the longitudinal axis of the body 14 and aligned with the outlet hole 46. The pressure chamber 50 communicates with the input bore or chamber 16 through a cylindrical passage or bore 51, and also communicates with the inlet bore 24 through an opening 52 in the threaded adapter portion 18.

The front wall of the pressure gauge chamber 50 is provided with an opening 54 communicating with a recessed window 55, which is covered or filled with a sight glass 56 marked with gauge graduations 57, such as "E" for empty, "½" for one-half pressure, and "F" for full pressure. Adapted to reciprocate through the opening 54 beneath the glass 56, and longitudinally and axially of the pressure gauge chamber 50, is a rod 60. The rod 60 is adapted to reciprocate through the apertured washer assembly 61 which seals the front end of the chamber 50 against pressure leakage. The rod 60 is normally biased rearwardly to its empty position disclosed in FIGS. 1 and 2, by means of a coil spring 62. When the rod 60 is urged forwardly by an increase of pressure in the chamber 50, the front end of the rod 60 is moved proportionately to align with the corresponding graduations 57 to indicate the extent of the pressure within the chamber 50. The rear end of pressure chamber 50 is closed by a retaining screw 64.

If desired a conventional cut-off valve 66 may be included between the locking nut 22 and the hose 12 to manually regulate the volume flow of gas through the torch tip 11.

With the above described torch handle structure, the automatic operation of the device becomes apparent. With the hose 12 secured to a conventional gas cylinder containing, for example, acetylene gas under compression, the handle structure 10 connected through the adapter 20 to the hose 12, and through the tip adapter 48 to the torch tip 11, the operator has only to manipulate the screw cap 41 in order to determine the amount of gas pressure which he desires for the welding operation. When the operator is ready to weld, he merely opens the valve 66 to release gas through the handle structure 10 and tip 11. When the gas is exhausted through the torch tip 11 to such an extent that the pressure in the output chamber 27 is reduced below its predetermined value, the bellows spring 38 will thrust the bellows 35 and the actuator rod 43 toward the rear to force the ball valve 30 off of its seat 29 and open passage 28 to permit additional gas to flow from the hose 12 through the passage 28 into the output chamber 27. As the pressure in the output chamber 27 increases, it will urge the bellows 34 forwardly to compress the bellows spring 38 and permit the ball valve 30 to reseat and close the valve passage 28. This operation continues automatically to maintain a constant predetermined gas pressure available to the welder. Moreover, the gas pressure in the cylinder is constantly indicated to the welder at the welding site through the gauge rod 60 as viewed through the sight glass 56 in the handle structure 10.

It is therefore apparent that this novel handle structure 10 functions not only as a convenient torch handle, but also includes the pressure regulator and pressure gauge in one combined structure for the convenience of the welding operator, even though he may be operating in remote positions from the location of the gas cylinder. Moreover, the invention provides a compact unit which eliminates separate and bulky elements previously required in a welding unit.

It will be apparent to those skilled in the art that various changes may be made in the invention without departing from the spirit and scope thereof, and therefore the invention is not limited by that which is shown in the drawings and described in the specification, but only as indicated in the appended claim.

What is claimed is:
1. A torch handle structure containing a pressure-regulator and a pressure gauge comprising:
 (a) an elongated body member having a front end, a rear end, an upper portion and a lower portion,
 (b) said body member having a transverse, substantially ovoid cross-section, said upper portion being narrower than said lower portion to adapt said body member to be comfortably gripped by an adult, human hand,
 (c) a fluid input chamber in said lower portion adjacent said rear end,
 (d) a fluid output chamber in said lower portion adjacent said front end,
 (e) valve means in said lower portion communicating said input chamber with said output chamber,
 (f) pressure-regulating means in said lower portion for controlling said valve means to open and close communication between said input chamber and said output chamber,
 (g) a pressure chamber in said upper portion having a longitudinal axis parallel to the longitudinal axis of said body,
 (h) a fluid passage between said input chamber and said pressure chamber,
 (i) a recessed window in said upper portion,
 (j) means in said upper portion visible through said window for indicating the pressure in said pressure chamber,
 (k) an inlet bore in said rear end communicating with said input chamber,
 (l) a hose coupling member received in fluid communication with said inlet bore, and adapted to be connected to a fluid supply hose,
 (m) an outlet hole in said upper portion and said front end, said outlet hole having a longitudinal axis parallel to the longitudinal axis of said body member,
 (n) a connecting bore extending upwardly through said body and connecting said output chamber and said outlet hole in fluid communication, and
 (o) a tip adapter received in said outlet hole substantially parallel to the longitudinal axis of said body member for fluid communication with a torch tip.

References Cited
UNITED STATES PATENTS

| | | | |
|---|---|---|---|
| 1,815,533 | 7/1931 | Vincent | 137—224 |
| 2,079,564 | 5/1937 | Roehm | 239—74 |
| 2,501,801 | 3/1950 | Wallin | 137—224 |
| 3,139,902 | 7/1964 | Thomas | 137—557 |

HENRY T. KLINKSIEK, *Primary Examiner.*